Jan. 12, 1960 C. B. POST 2,920,602
IGNITION TIMING METHOD AND APPARATUS FOR
AIRCRAFT INTERNAL COMBUSTION ENGINES
Filed Nov. 19, 1958 2 Sheets-Sheet 1

INVENTOR.
CHARLES B. POST
BY
James L. O'Brien
ATTORNEY

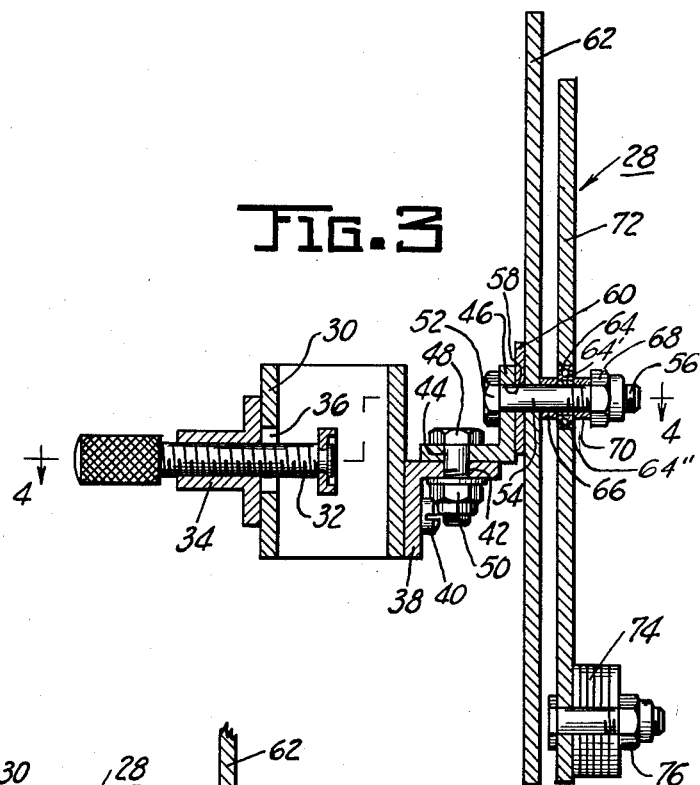
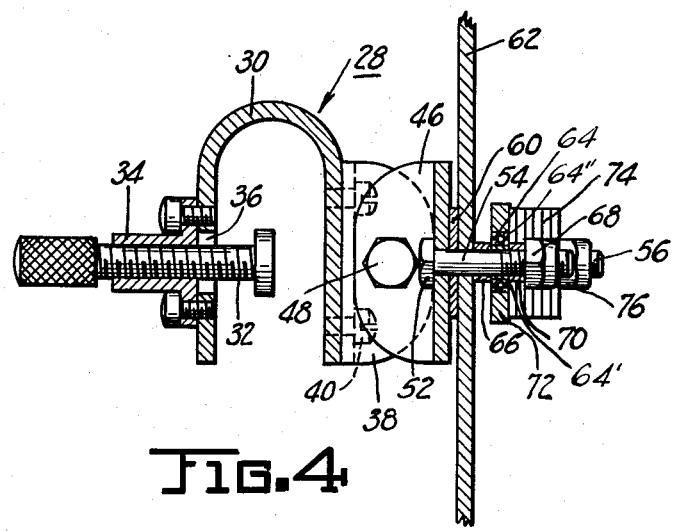
INVENTOR.
CHARLES B. POST
BY
*James L. O'Brien*
ATTORNEY

United States Patent Office 2,920,602
Patented Jan. 12, 1960

2,920,602

IGNITION TIMING METHOD AND APPARATUS FOR AIRCRAFT INTERNAL COMBUSTION ENGINES

Charles B. Post, South Bend, Ind.

Application November 19, 1958, Serial No. 775,022

1 Claim. (Cl. 116—124)

The present invention relates to an improvement in ignition timing methods and apparatus for aircraft internal combustion engines.

The use of a signal light to indicate the opening of the magneto breaker points is well-known in the engine-timing art. Some difficulty has been experienced, however, in correlating the position of the engine pistons or crankshaft with the indicator light so as to determine the ignition timing angle. It has been previously proposed to use a probe inserted through a spark plug seat or opening to determine piston position. The use of probes to determine the top dead center position of piston by observing an extreme condition of probe travel has been relatively successful. The use of probes to determine the piston position at the time of the ignition spark has not, however, proved successful. Due to the many different piston configurations, and designs of spark plug openings with respect to piston location, a considerable number of probes of different configurations would be required for the various engines now in operation. Also due to changes in engine components during overhaul, the original factory specifications of the engine may no longer apply, in which case probes designed to factory specifications no longer apply. Inaccuracies occur through improper seating of the probe in the spark plug seat, wear or bending of the probe, and through the engagement of the probe with carbon deposits or impurities on the piston head rather than the true surface of the piston head.

It has also been proposed to use reference marks on the engine and the engine crankshaft to determine the ignition timing angle. In aircraft applications the use of these marks, if present, is inconvenient as it is generally required that the propeller and engine cowling be removed to see the reference marks. Also reference marks are not universally used on aircraft engines and even where used may be rendered unreliable in the course of an engine overhaul.

It is an object of the present invention to provide an ignition timing apparatus which may be secured to an engine propeller for indicating the angular rotation of the engine crankshaft from top dead center position to the position at which the ignition spark occurs.

It is a further object of the invention to provide an ignition timing apparatus which is simple in construction and accurate and reliable in operation.

It is a still further object of the invention to provide an improved method for determining the ignition timing angle of an internal combustion engine.

These and other objects and advantages of the present invention will become readily apparent from the following detailed description taken in connection with the accompanying drawings wherein:

Figure 3 is a sectional view taken along line 3—3 of Figure 2; and

Figure 4 is a sectional view taken along line 4—4 of Figure 3.

Figure 1:
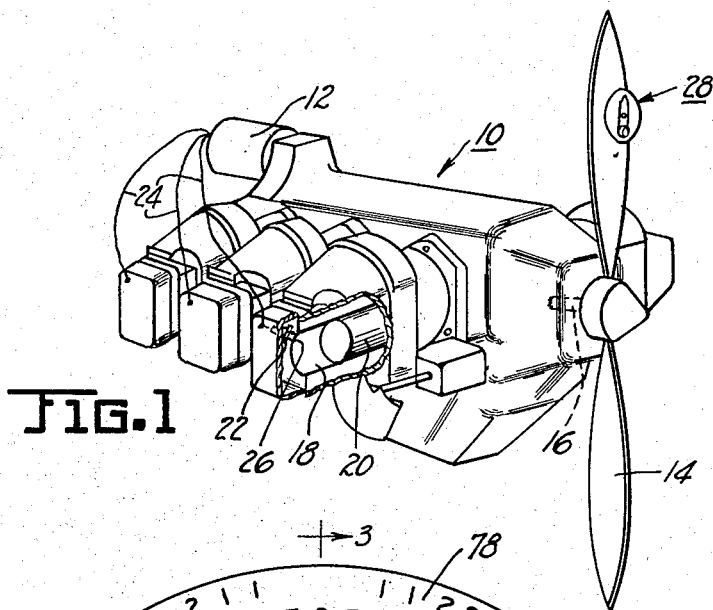
Figure 1 is a perspective view of an aircraft engine with a portion broken away and showing the ignition timing apparatus of the present invention fixed in its operative position on the propeller.
Figure 2:
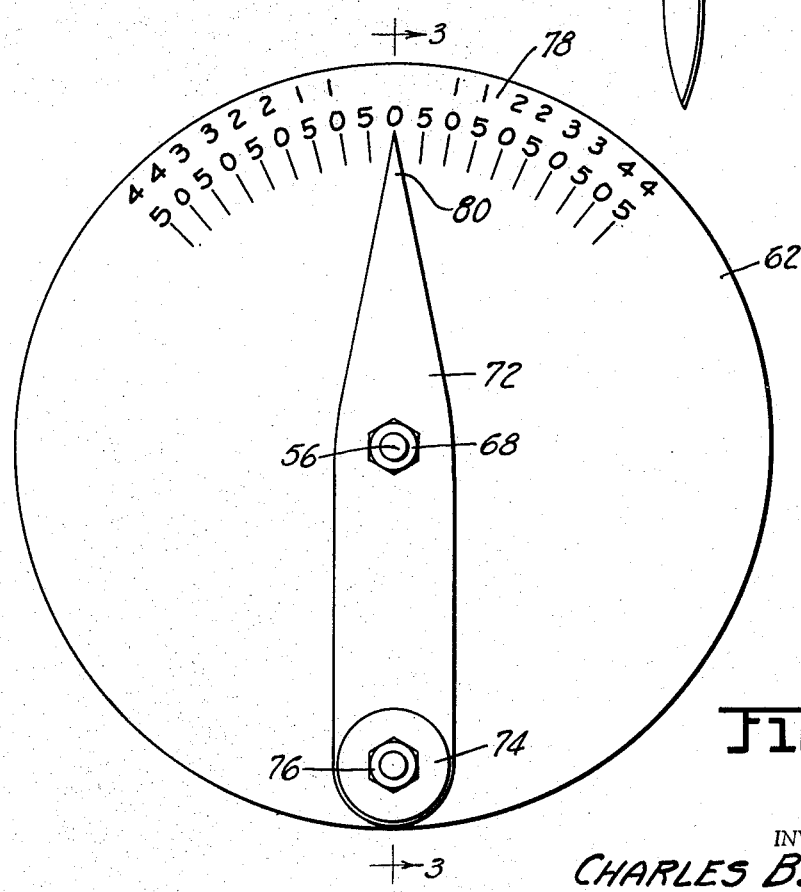
Figure 2 is a front view of the timer shown in Figure 1.

Referring now to the drawings and more particularly to Figure 1, numeral 10 designates an aircraft internal combustion engine having a magneto 12, propeller 14 secured to a crankshaft 16. As shown in Figure 1, the number one cylinder 18 of engine 10 is broken away to show piston 20 which is connected to crankshaft 16 by a conventional connecting rod (not shown). Magneto 12 is connected to spark plugs 22 by suitable leads 24. As shown, a spark plug 22 may be removed from its seat 26 to provide access to the interior of cylinder 18.

Timer 28 is provided with a clamp or base member 30 which is adapted to fit over an edge of propeller 14 and to be secured thereto by a member 32 threadedly disposed in a sleeve 34 which is secured to base member 30 in registration with a bore 36 formed in said base member. A flanged member 38 is secured to clamp 30 by suitable bolts 40 and is formed with a bore 42 which is adapted to register with a bore 44 formed in an intermediate flanged lever or member 46. A suitable bolt 48 is disposed in bores 42 and 44 and is provided with a nut 50 to clamp members 38 and 46 into frictional engagement but permitting relative motion therebetween.

A bolt 52 provided with a smooth shaft portion 54 and a threaded end portion 56 projects through a bore 58 formed in intermediate member 46 to receive a washer 60. A plate or indicating member 62 is rotatably mounted on shaft portion 54 of bolt 52 adjacent washer 60. A roller bearing 64 having an inner race 64' and an outer race 64" is mounted on shaft 54 and spaced from plate 62 by a sleeve 66. A nut 68 threadedly engages end portion 56 of bolt 52 and abuts a sleeve 70 to force plate 62 into frictional engagement with washer 60.

A pointer 72 is secured to the outer race 64" of bearing 64 for unrestricted rotation about shaft 54. A weight 74 is secured to one end of pointer 72 by a bolt 76 and is arranged to cause pointer 72 to assume a vertical or reference position under the influence of gravity. In practice the pointer may be displaced substantially from the vertical plane and still assume a proper reference position under the influence of gravity.

In operation, clamp 30 is fitted over an edge of the propeller and secured thereto by tightening member 32. The flanged members 38 and 46 are then positioned to accommodate for propeller pitch so as to place plate 62 in approximately the vertical plane. Propeller 14 is then rotated to the top dead center position of the cylinder under observation. The plate 62 is then rotated about shaft 54 to place the zero marking of the angular interval scale 78 formed on the face thereof in registration with the end 80 of pointer 72. The propeller is then rotated to the point where an ignition spark occurs in the cylinder under observation. The rotation of the propeller 14 causes plate 62 to be rotated or displaced with respect to pointer 72 by an amount directly equal to the ignition timing angle or in the case of a geared propeller by an amount related to the ignition timing angle as a function of the gear ratio. The magneto is adjusted to compensate for a disparity between the observed timing angle and the desired or standard timing angle for the particular engine under consideration.

Although the invention has been described with respect to a preferred embodiment thereof, it is to be understood that it is not to be so limited since changes and modifications can be made therein which are within the full intended scope of this invention as defined by the appended claim.

I claim:

An ignition timer for an aircraft engine having an engine driven propeller comprising a clamp adapted to be mounted on said propeller, an intermediate member pivotally secured to said clamp for rotation in a plane substantially perpendicular to said clamp, a shaft projecting from said member, said shaft being provided with a threaded end portion and a smooth intermediate portion, an indicator plate rotatably mounted on the smooth portion of said shaft, said indicator plate being marked in angular intervals, a roller bearing mounted on said shaft, said bearing having an inner race and an outer race, a first sleeve mounted on said shaft between said indicator plate and bearing, a pointer secured intermediate its ends to the outer race of said bearing, a weight formed at one end of said pointer whereby said pointer is urged to assume a reference position under the influence of gravity, a nut threadedly engaging the end portion of said shaft, a second sleeve mounted on said shaft between said bearing and said nut, said first and second sleeves being constructed and arranged to engage the inner race of said bearing whereby said nut may be tightened to frictionally clamp said indicator plate in position with said pointer free to rotate with the outer race of said bearing.

References Cited in the file of this patent
UNITED STATES PATENTS

| | | |
|---|---|---|
| 768,689 | Pali | Aug. 30, 1904 |
| 888,826 | Kooken | May 26, 1908 |
| 2,035,880 | Goodale | Mar. 31, 1936 |